US008535161B2

United States Patent
Norris

(10) Patent No.: US 8,535,161 B2
(45) Date of Patent: Sep. 17, 2013

(54) VIDEO GAME AND METHOD FOR EVALUATING AND IMPROVING OFFICIATING SKILLS

(76) Inventor: Keith A. Norris, Wichita, KS (US)

( * ) Notice: Subject to any disclaimer, the term of this patent is extended or adjusted under 35 U.S.C. 154(b) by 124 days.

(21) Appl. No.: 13/242,850

(22) Filed: Sep. 23, 2011

(65) Prior Publication Data

US 2013/0079071 A1    Mar. 28, 2013

(51) Int. Cl.
    *G07F 17/32*    (2006.01)
(52) U.S. Cl.
    USPC .................................. 463/42; 463/43; 463/44
(58) Field of Classification Search
    USPC ....................................................... 463/42–44
    See application file for complete search history.

(56) References Cited

U.S. PATENT DOCUMENTS

2010/0087238 A1 *    4/2010    Miles ................................ 463/7

* cited by examiner

*Primary Examiner* — Omkar Deodhar
(74) *Attorney, Agent, or Firm* — Hovey Williams LLP

(57) ABSTRACT

An interactive video game is provided on a video gaming system in which one or more sports teams having individual players compete in a simulated sporting event that has a set of rules enforceable by an official. A method of operating the video game includes allowing a user to control the actions of the official in enforcing the set of rules by manipulating a controller to provide input data, processing the input data and comparing the input data against a reference set of appropriate actions of the official, and assigning a performance grade to the user based on the comparison of the input data against said reference set of appropriate actions of the official. In this manner, the officiating skills of the user may be evaluated against a reference set of appropriate officiating calls or rulings involving the actions of the individuals in the simulated sporting event.

19 Claims, 2 Drawing Sheets

VIDEO GAME AND METHOD FOR EVALUATING AND IMPROVING OFFICIATING SKILLS

BACKGROUND OF THE INVENTION

The present invention relates generally to video games and, more particularly, to interactive video games involving simulated real-life sporting events in which an official, referee or other individual is used to enforce the rules of play or to otherwise regulate the conduct of the game.

Interactive video games have been developed that allow individuals to control the actions of a player in a team sporting event such as American football, soccer, baseball, basketball, and hockey. These video games have progressed in sophistication to allow more than one individual to control different players in the same game, including by being networked together from different locations. Many of these games include an official, also known by various names such as a referee, linesman, judge, umpire, etc., who participates in the conduct of the game by enforcing the rules of play. The game is programmed so that the official automatically calls certain fouls or penalties if a player violates a game rule, but the official, unlike the game players, cannot be controlled by an individual. For example, in the Madden NFL® video game, the referee is programmed to call a pass interference penalty if a defensive back controlled by an individual tackles a receiver before the pass is touched by the receiver. As another example, in the FIFA® soccer video game, the official is programmed to automatically call an offsides penalty when an offensive player controlled by an individual passes the ball to another offensive player who is closer to the other team's goal than the last defender.

Developing the knowledge and skills needed to officiate a sporting event is often a difficult process that can require many years of practice and experience. Even after a person learns the entire set of rules of play for the particular sport, he or she must learn to visually identify rules violations during play and make split-second decisions to call a foul or assess a penalty. A person will normally begin officiating youth sporting events where the pace of play is slower and the skills needed to officiate can be more easily developed. As the person's officiating skills develop, he or she is able to progress to more competitive levels of play. For those persons desiring to officiate the higher levels of competition, many years of officiating lower level games may be required before the person develops the necessary officiating skills. The pace of development is dictated in large part by how many games the official is able to officiate, but in some sports the games are played only on certain days of the week and only during certain months of the year. As a result, the pace of an official's development may be slowed simply because of a lack of opportunity to officiate live games.

In addition, although players, coaches and spectators frequently provide vocal feedback to officials during and after a game, an objective evaluation of an official's performance is typically only available when other officials watch a replay of the game and provide instructional feedback. This type of objective evaluation is typically only provided at the higher levels of competition and can require a substantial time commitment on behalf of evaluating officials.

A need has arisen for methods of allowing a person to more quickly develop and improve his or her officiating skills for a particular sporting event without having to rely primarily on officiating live games and receiving feedback from other officials who review replays of those games.

SUMMARY OF THE INVENTION

In one aspect, the present invention is directed to an interactive video game in which one or more sports teams having individual players compete in a simulated sporting event that has a set of rules enforceable by one or more officials. The video game is encoded in a non-transitory computer readable medium and is part of a video game system that includes a computer that is a repository for data and an executable program for the video game, a display device operably coupled with the computer and on which the simulated sporting event is viewable by the user, and a controller operably coupled with the computer that allows the user to send input data to the computer.

The video game allows one or more users, at the same or different locations, to control the actions of the one or more officials in enforcing the set of rules in the simulated sporting event by manipulating the controller to provide input data in the video gaming system. The video game processes and compares the input data against a reference set of appropriate actions of the official and then assigns a performance grade to the user based on the comparison of the input data against the reference set of appropriate actions of the official. In this manner, the user is able to practice and develop his or her officiating skills and receive an evaluation of his or her performance. The performance evaluation can be used as a basis for determining whether the user is able to qualify to officiate certain levels of real-life sporting events corresponding to the simulated sporting event.

In another aspect, the present invention is directed to a method of operating an interactive video game on a video gaming system in which one or more sports teams having individual players compete in a simulated sporting event that has a set of rules enforceable by an official. The method includes the steps of allowing a user to control the actions of the official in enforcing the set of rules in the simulated sporting event by manipulating a controller to provide input data in the video gaming system, processing the input data and comparing the input data against a reference set of appropriate actions of the official, and assigning a performance grade to the user based on the comparison of the input data against said reference set of appropriate actions of the official. In this manner, the officiating skills of the user may be evaluated against a reference set of appropriate officiating calls or rulings involving the actions of the individuals in the simulated sporting event. For example, when the user manipulates the controller to generate input data signaling that a basketball player has stepped out of bounds with the basketball in violation of a specific one of the rules of play, the input data is compared against a reference set of violations that the video game determines should or should not have been signaled at that time. As an example, as a result of processing the input data and comparing it against the reference set of violations, the video game may determine that the basketball player did not step out of bounds with the ball, but instead violated the rule against travelling with the ball. The user is then assigned a negative performance grade for making an incorrect out-of-bounds call or signal and for missing the correct rules violation, i.e., travelling with the ball. On the hand, if the video game determines that the user correctly called the out-of-bounds rules violation, the user will then be assigned a positive performance grade.

If the user's performance grade exceeds certain positive or negative thresholds, the pace of the play of the simulated sporting event is increased or decreased, respectively, to better match the officiating capabilities of the user. In one embodiment, the input data generated by the user interrupts or otherwise alters the course of play of the simulated sporting event. For example, if the user manipulates the controller to signal that an out-of-bounds violation has occurred in a simulated basketball game, the play is stopped and a player from the opposing team is given the basketball at the spot of the out-of-bounds violation and may then inbound the ball in accordance with the rules of basketball. In another embodiment, the input data generated by the user controls the movements of the official in the simulated sporting event. For example, by manipulation of the controller, the user is able to move the location of the official in the simulated sporting event so that the official is in a better position to view the movements of the individual players and determine when rules violations have occurred. The display screen may then show the simulated sporting event from the perspective of the official. As another example, the user is able to control the arm and hand movements of the official to replicate the arm and handle signals that are used to indicate specific rules violations in particular sporting events. The arm and hand movements are not limited to indicating rules violations, but can be used for other purposes such as to provide a visual counting of the number of seconds a basketball player is holding the ball before throwing it inbounds. In yet another embodiment, the user is able to manipulate the controller to provide responses to queries presented in the simulated sporting event. For example, a player may question why he or she was signaled for a specific rules violation and the user may then select from a number of possible responses presented on the display screen.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

DETAILED DESCRIPTION

Figure 1:
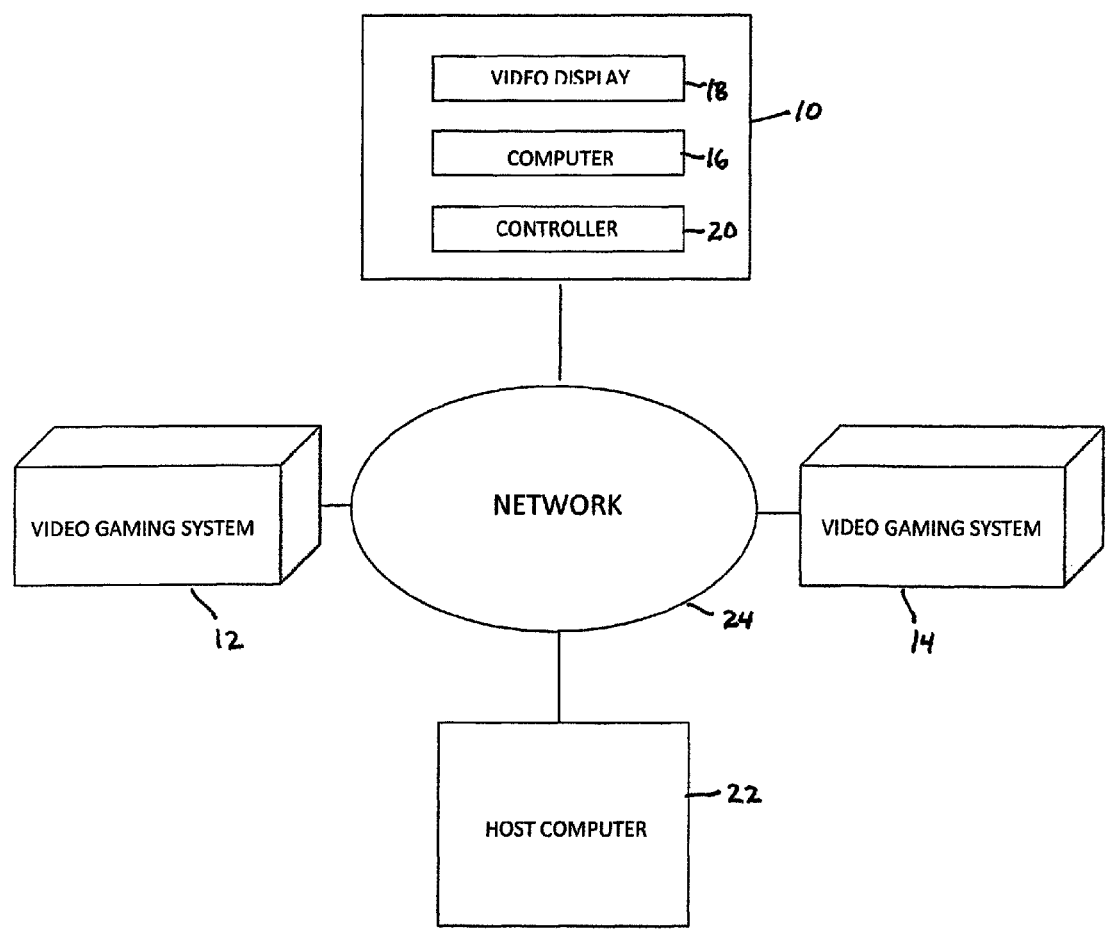
FIG. 1 is a schematic diagram of video gaming systems and communications equipment that may be used to implement certain aspects of the present invention.

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention provide methods, systems, and computer programs that allow a user to manipulate an input device for an interactive video game in which one or more sports teams having individual players compete in a simulated sporting event that has a set of rules enforceable by an official. As used herein, the term "official" includes referees, linesmen, judges, umpires, and other individuals who enforce rules in a real-life sporting event, but may be more commonly known by different names in the particular sporting event. The user is able to control the actions of the official in enforcing the set of rules in the simulated sporting event by manipulating a controller to provide input data in the video gaming system. The input data is processed and compared against a reference set of appropriate actions of the official and a performance grade is then assigned to the user based on the comparison of the input data against said reference set of appropriate actions of the official. Other features and aspects of the invention are described in more detail below.

The invention can be implemented in hardware, software, firmware, or a combination thereof. In one exemplary embodiment, the invention is implemented with one or more video gaming systems 10, 12, and 14 that can be used by sports officials or other users seeking to develop and improve their officiating skills. Each video gaming system 10, 12, and 14 comprises a computer 16 and a video display 18 and a controller 20 that are operatively associated with the computer 16.

The computer 16 can be any electronic device capable of executing a video game program in accordance with the present invention, such as, but not limited to, a desktop computer, a laptop computer, a notebook computer, an embedded computer in a handheld electronic device such as a wireless phone, phone-enabled personal digital assistant, MP3 devices, and handheld game players, and game consoles.

The video display 18 may be any device capable of receiving signals from the computer to visually display the simulated sporting event, such as a television, computer monitor, or display screen associated with a handheld electronic device. The video display 18 may use any suitable technology, such as a light-emitting diode display (LED), a plasma display panel (PDP), a liquid crystal display (LCD), and an electroluminescent display (ELD).

The controller 20 may be any device operable by a user to generate input data to the computer 16. For example, the controller 20 can be a keyboard, keypad, mouse, joystick, touch panel, or touch screen. The computer 16, video display 18, and controller 20 may form one or more integrated devices or they may be separate components.

If more than one video gaming system 10, 12, 14 is used, they may communicate with each other and/or with one or more host computers 22 via a communications network 24. The host computers 22 may serve as repositories for data and programs used to implement certain aspects of the present invention as described in more detail below. The host computers 22 may be any computing devices such as network or server computers and may be connected to a firewall to prevent tampering with information stored on or accessible by the computers. The functionality of the host computers may also be distributed amongst many different computers in a cloud computing environment.

One of the host computers 22 may be a device that operates or hosts a website accessible by at least some, or all, of the video gaming systems 10, 12, and 14. The host computer 22 includes conventional web hosting operating software, an Internet connection such as a cable connection, satellite connection, DSL converter, or ISDN converter, and is assigned a URL and corresponding domain name so that the website hosted thereon can be accessed via the Internet in a conventional manner.

The communications network 24 may also include or use a data interchange format device 26 for distinguishing the types of video gaming system devices (e.g. wireless phone, desktop computer) that attempt to access the host computers 12 and for routing communications and requests to the host computers accordingly. Each video gaming systems 10, 12, and 14 may include or can access a web browser and a conventional Internet connection such as a wireless broadband connection, a modem, DSL converter, or ISDN converter that permits it to access the Internet.

The communications network 24 is preferably the Internet but may be any other communications network such as a local area network, a wide area network, a wireless network, or an intranet. The communications network 30 may also be a combination of several networks. For example, the video gaming systems 10, 12, and 14 may wirelessly communicate with a computer or hub in a store via a WiFi network, which in turn is in communication with one or more of the host computers 12 via the Internet or other communication network.

The executable computer program for the video game of the present invention is stored in or on computer-readable medium residing on or accessible by the video gaming systems 10, 12, and 14. For example, the non-transitory computer program may be stored on the computers 16 and/or one or more of the host computers 22. The computer program preferably comprises ordered listings of executable instructions for implementing logical functions in the host computer 22 and/or the computers 16 in the video gaming systems 10, 12, and 14. As one example, the computer program may implement a website hosted on the host computer 22 that may be accessed by the video gaming systems 10, 12, and 14. As another example, the computer program may be stored and executed on the computers 16.

The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 2:
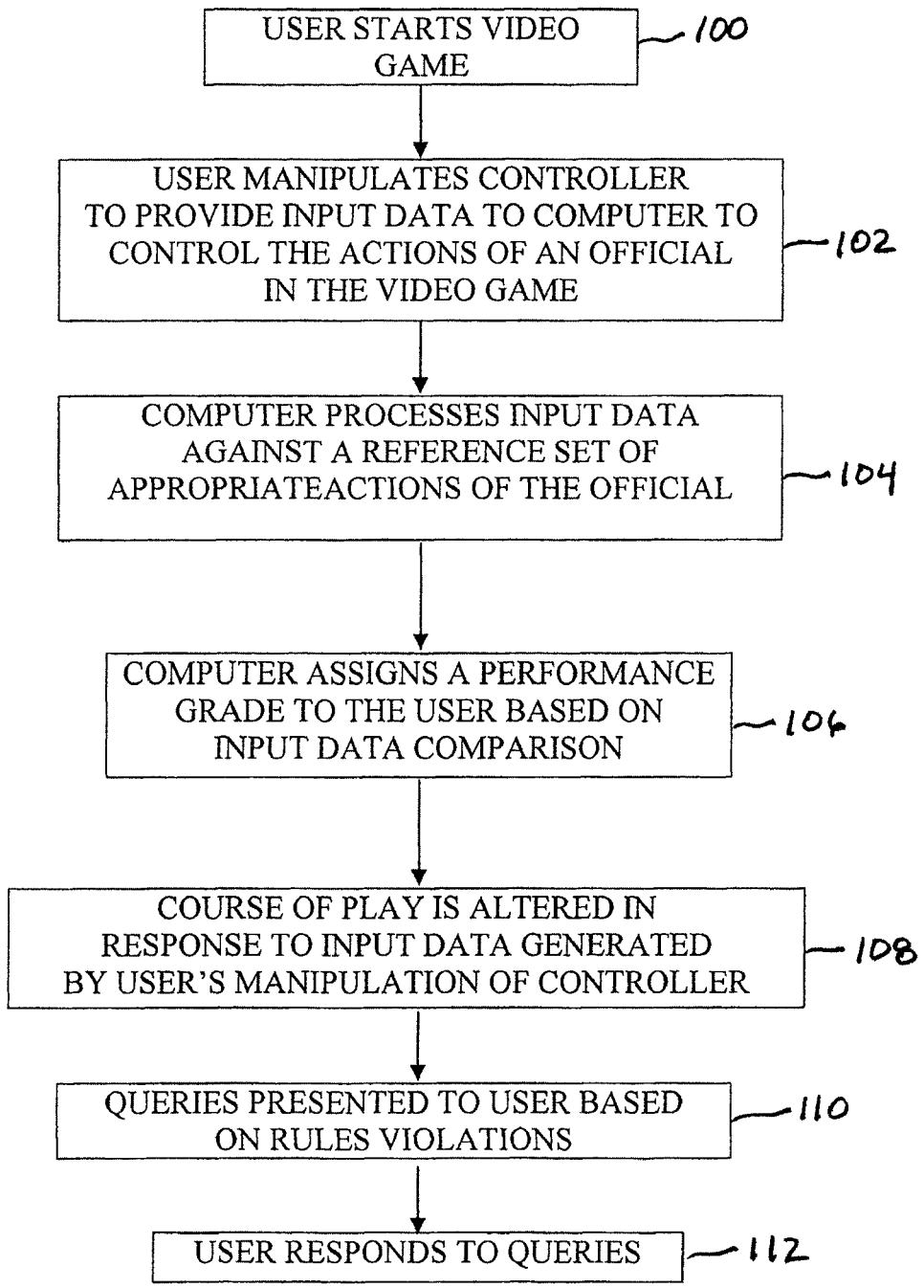
FIG. 2 is a depiction of process steps of the present invention.

The following paragraphs describe features and functions of the invention with reference to the method steps illustrated in FIG. 2. In method step 100, a user of one of the video gaming systems 10, 12, or 14 initiates the video game computer program which then displays a simulated sporting event on a video display 18. The simulated sporting event can be any of various sports such as American football, soccer, baseball, basketball, and hockey that have a set of rules enforceable by an official. In step 102, the user controls the actions of an official appearing in the simulated sporting event by manipulating the controller 20 to provide input data to the computer 16 or 22 on which the video game computer program is running. At the same time, one or more other users of the other video gaming systems 10, 12, or 14 may be permitted to control the actions of another official appearing in the simulated sporting event.

In one embodiment, the user is able to control the actual movements of the official in the simulated sporting event. For example, the user may be able to control the location and field of view of the official in the simulated sporting event. The field of view of the official is then presented on the video display 18. As another example, the user is able to control the movements of the arms, hands, feet, legs, and/or other parts of the body, as well as control the facial expressions, of the official to simulate the actual gestures that are used by officials in the real-life sporting event to signal a specific rules violation. The control of movement of the arms, hands, feet, legs, and/or other body parts and facial expressions may be for other purposes as well, such as to signal the number of seconds that are being counted or to convey a message to a player, coach or other official.

The input data is then processed by the computer 16 or 22 in step 104 and compared against a reference set of appropriate actions of the official as determined or programmed in the video game computer program. The video game computer program then assigns a performance grade to the user in step 106 based on the comparison of the input data against the reference set of appropriate actions of the official.

In one embodiment, the video game has a variable level of play and the level of play is adjusted in step 108 based on the performance grade assigned to the user. Thus, if the user is receiving a poor performance grade because he or she fails to properly enforce the rules of play for simulated sporting event, the level of play is lowered to make it easier for the user to properly enforce the rules of play. Lowering the level of play can be achieve in any of various ways, such as slowing the pace of play and/or by presenting fewer violations of the rules of play that the user must observe and appropriate identify. Conversely, if the user is receiving a good performance grade, the level of play can be increased by increasing the pace of the game and/or by presenting a higher level of difficulty through the use of uncommon rules violations and game situations to better challenge the officiating skills of the user.

The course of play of the simulated sporting event may be altered in step 112 in response to the input data generated by manipulation of the controller 20 by the user. Thus, the user-controlled official is an active participant in the simulated sporting event and may stop or otherwise alter the course of play in response to the user's identification of a violation of the set of rules. This forces the user to know the appropriate action that must be taken once a rules violation has been identified. For example, the user-manipulated official in a simulated basketball game must determine whether a player who was fouled must shoot free-throws or be given the ball out of bounds and at what location.

In step 114, the user is presented with queries to answer in response to identification of a rules violation or failing to identify a rules violation. The queries may be of the type that a player or coach would typically present to the official in an actual sporting event and to which the official must respond in order to maintain control of the course of play. For example, a coach may question why the official called a foul on the defensive player rather than a charging foul on the offensive player. The user-controlled official may then respond to the query in step 116 by explaining that the defensive player moved into position as the offensive player was moving through the air. Various responses can be presented on the video display 18 and the user can select the response he or she believes is most appropriate by manipulation of the controller 20.

It will be appreciated that the video game operable on the video gaming system 10, 12 or 14 allows the user to practice, develop, and maintain his or her officiating skills and receive performance feedback so that the user is able to gauge his or progress. The video game thus allows the users to practice, develop, and maintain their skills without having to rely solely on officiating actual sporting events. The video game can also be used as a tool in the selection and advancement of officials by the governing bodies for specific sports. Upon conclusion of the video game, the user may print out an evaluation report in which the performance grade is reflected in a summary of the specific rules violations correctly and incorrectly identified, as well as other information helpful in the evaluation of the officiating skills of the user. The video game may also save the performance grade of a user for comparison against the performance grades of other users.

Although the invention has been described with reference to exemplary embodiments illustrated in the attached drawing figures, it is noted that equivalents may be employed and substitutions made herein without departing from the scope of the invention as recited in the claims.

What is claimed is:

1. An interactive video game in which one or more sports teams having individual players compete in a simulated sporting event that has a set of rules enforceable by an official, the video game being encoded in a non-transitory computer readable medium and operable to:
    allow a user to control the actions of the official in enforcing the set of rules in the simulated sporting event by manipulating a controller to provide input data in the video gaming system;
    process and compare the input data against a reference set of appropriate actions of the official; and
    assign a performance grade to the user based on the comparison of the input data against said reference set of appropriate actions of the official,
    wherein the simulated sporting event in the interactive video game has a variable level of play and wherein the level of play is adjustable during the course of play in response to the performance grade assigned to the user.

2. The video game of claim 1, additionally operable to alter a course of play of the simulated sporting event by the individual players in response to the input data.

3. The video game of claim 1, additionally being operable to allow the user to control the movements of the official in the simulated sporting event.

4. The video game of claim 1, additionally being operable to allow the user to interrupt the course of play and identify a specific rule that has been violated by an action of one or more of the individual players competing in the simulated sporting event.

5. The video game of claim 4, additionally being operable to allow the user to respond to queries presented in the simulated sporting event regarding the action of the one or more of the individual players that was identified as violating the specific rule.

6. The video game of claim 1, additionally operable to alter a course of play of the simulated sporting event by the individual players in response to the input data and wherein the simulated sporting event in the interactive video game has a variable level of play and wherein the level of play is adjustable during the course of play in response to the performance grade assigned to the user.

7. The video game of claim 6, additionally being operable to allow the user to control the movements of the official in the simulated sporting event.

8. The video game of claim 7, additionally being operable to allow the user to interrupt the course of play and identify a specific rule that has been violated by an action of one or more of the individual players competing in the simulated sporting event.

9. The video game of claim 8, additionally being operable to allow the user to respond to queries presented in the simulated sporting event regarding the action of the one or more of the individual players that was identified as violating the specific rule.

10. A method of operating an interactive video game on a video gaming system in which one or more sports teams having individual players compete in a simulated sporting event that has a set of rules enforceable by an official, the method comprising the steps of:
    allowing a user to control the actions of the official in enforcing the set of rules in the simulated sporting event by manipulating a controller to provide input data in the video gaming system;
    processing the input data and comparing the input data against a reference set of appropriate actions of the official;
    assigning a performance grade to the user based on the comparison of the input data against said reference set of appropriate actions of the official, and
    processing the input data and altering a course of play of the simulated sporting event by the individual players in response to the input data.

11. The method of claim 10, wherein the simulated sporting event in the interactive video game has a variable level of play and wherein the level of play is adjusted during the course of play in response to the performance grade assigned to the user.

12. The method of claim 10, wherein said step of allowing the user to control the actions of the official includes allowing the user to control the movements of the official in the simulated sporting event.

13. The method of claim 10, wherein said step of allowing the user to control the actions of the official includes allowing the user to interrupt the course of play and identify a specific rule that has been violated by an action of one or more of the individual players competing in the simulated sporting event.

14. The method of claim 13, wherein said step of allowing the user to control the actions of the official includes allowing the user to respond to queries presented in the simulated sporting event regarding the action of one or more of the individual players that was identified as violating the specific rule.

15. A method of operating an interactive video game on a video gaming system in which one or more sports teams having individual players compete in a simulated sporting event that has a set of rules enforceable by an official and has a variable level of play, the method comprising the steps of:
    allowing a user to control the actions of the official in enforcing the set of rules in the simulated sporting event by manipulating a controller to provide input data in the video gaming system;
    processing the input data and comparing the input data against a reference set of appropriate actions of the official;
    assigning a performance grade to the user based on the comparison of the input data against said reference set of appropriate actions of the official; and adjusting the level of play of the simulated sporting event in the interactive video game in response to said performance grade.

16. The method of claim 15, including processing the input data and altering a course of play of the simulated sporting event by the individual players in response to the input data.

17. The method of claim 15, wherein said step of allowing the user to control the actions of the official includes allowing the user to control the movements of the official in the simulated sporting event.

18. The method of claim 15, wherein said step of allowing the user to control the actions of the official includes allowing the user to interrupt the course of play and identify a specific rule that has been violated by an action of one or more of the individual players competing in the simulated sporting event.

19. The method of claim 18, wherein said step of allowing the user to control the actions of the official includes allowing the user to respond to queries presented in the simulated sporting event regarding the action of one or more of the individual players that was identified as violating the specific rule.

* * * * *